No. 798,551. PATENTED AUG. 29, 1905.
A. B. WILLITS.
COMBINATION VALVE.
APPLICATION FILED MAY 11, 1905.
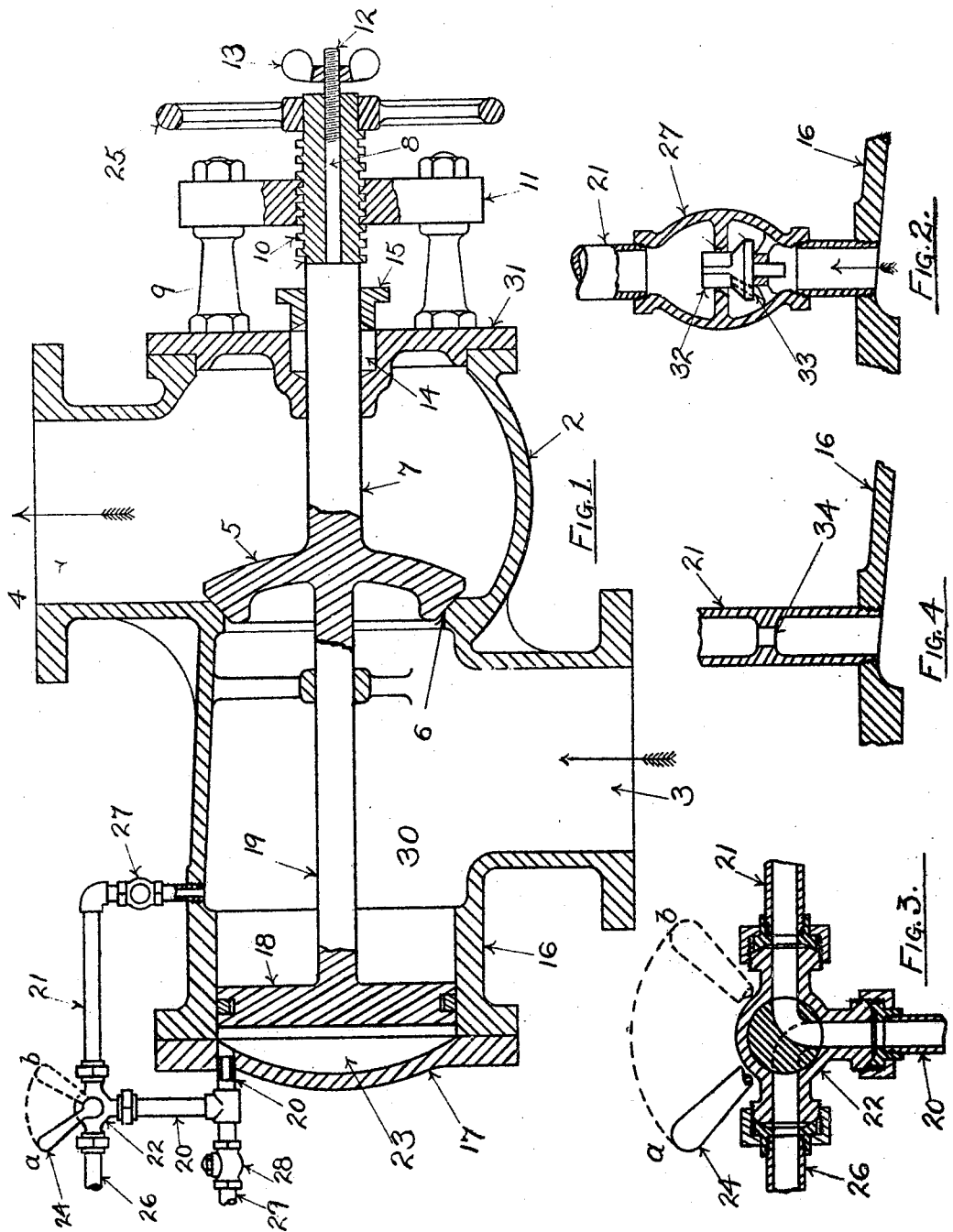

UNITED STATES PATENT OFFICE.

ALBERT B. WILLITS, OF THE UNITED STATES NAVY.

COMBINATION-VALVE.

No. 798,551.     Specification of Letters Patent.     Patented Aug. 29, 1905.

Application filed May 11, 1905. Serial No. 260,022.

*To all whom it may concern:*

Be it known that I, ALBERT B. WILLITS, commander, United States Navy, a citizen of the United States, residing in the city of Portsmouth, county of Norfolk, and State of Virginia, have invented certain new and useful Improvements in Combination - Valves, of which the following is a specification.

This invention relates to devices for controlling and regulating the flow of steam from boilers or generators through pipes to engines, and has for its object the providing an automatic non-return and emergency-stop valve that has its gate or valve-disk in direct and rigid connection with the actuating mechanism of the valve without the intervention of or the dependence upon springs or diaphragms for its functional operation, as is usually found in the design and construction of other valves of the kind mentioned.

It is also among the purposes of my said invention to provide an easily-operated and safe throttle-valve and also a nearly-balanced hand stop-valve.

Further advantages—among others the simplicity and cheapness of construction—of my said invention will more particularly appear in the following description and claims and by reference to the accompanying drawings, all of which will be readily understood by those skilled in the art to which my said invention appertains, and in which—

Figure 1 is a longitudinal sectional view of the main body of my said combination-valve. Fig. 2 is an enlarged sectional detail of the check-valve 27 shown in Fig. 1; and Fig. 3 is a similar detail of the cock 22, which is also shown in Fig. 1; and Fig. 4 is a modified form of outlet-passage from chamber 30 to pipe 21.

Referring to the accompanying drawings, 2 represents the main body or casing, having the inlet-opening 3 and outlet-opening 4 and provided with valve-disk 5, valve-disk seat 6, valve-stem 7, reduced diameter portion 8 of valve-stem 7, shoulder 9 in valve-stem 7, threaded sleeve 10, fitted loosely over the reduced portion 8 of valve-stem 7 and having its threads engaging similar threads in the yoke 11, all as shown. The reduced diameter portion 8 of the valve-stem 7 is provided with a threaded end 12, engaged by a similarly-threaded nut 13, as shown. The threaded sleeve 10 is provided with the usual valve hand-wheel 25, rigidly fastened to same in the usual manner. A steam-tight joint is maintained around the stem 7 by means of the stuffing-box 14 and gland 15, constructed in the bonnet 31, or in any other usual manner known to the art. The main body or casing 2 is also provided with an extension 16 and cover 17, forming a chamber for the travel of the piston 18, which is directly and rigidly connected to the valve-disk 5 by means of the rod 19, as shown on the drawings.

A regulated or controlled communication between the chambers 23 and 30, existing on the two sides of the piston 18 and from chamber 23 with the atmosphere, is made by means of conduits or pipes 20 and 21, in conjunction with a two-way cock 22 or equivalent device and its discharge-outlet 26, by means of which the valve-disk 5 is opened from or closed on its seat 6 when the valve is not being operated by the hand-wheel 25 as a hand stop-valve, as hereinafter explained.

For purposes also hereinafter explained there is or may be provided in the vertical part of the pipe 21, at a point anywhere between the cock 22 and the chamber 30, preferably as close to the chamber 30 as may be found practicable, a vertical check-valve 27, closing in case of a flow of steam from chamber 30 at high velocity, as in case of a free exit through said check-valve to the atmosphere, but remaining inactive under a velocity of flow insufficient in its force to pick up the contained valve-disk 32 against the force of gravity due to its weight, (see Fig. 2,) said valve-disk being provided with a small port or opening 33 to allow the passage of steam through same when closed for the purpose of restoring the pressure upon its exit side when having been closed by a too quick a full opening of the cock 22, as also after its closing by the fall in pressure in the pipe 29, hereinafter mentioned; also, a branch pipe 29, in which is placed a horizontal check-valve 28, closing in case of a flow of steam or water through same toward the chamber 23, but permitting a free flow in the opposite direction, this branch pipe 29 having a connection with the steam main pipe employed between the boiler and the engine or other point of steam distribution or consumption.

The effective pressure area of the piston 18 is slightly greater than that of the valve-disk 5 to which it is connected, so that when the chamber 23 is placed in free communication with the chamber 30 the actuating tendency of the steam-pressure in chambers 23 and 30 is to open or raise the valve-disk 5 from its seat 6, and thus open the valve for the passage of steam through it.

The chambers 23 and 30 are placed in free communication with each other by placing the ports of the two-way cock 22 in open position, as indicated by the lever 24 when at the position marked $a$ on the drawings, (see Fig. 3,) while, on the other hand, by placing the lever 24 at the position $b$ (indicated on the drawing by dotted lines) the steam-pressure in chamber 30 is cut off from the chamber 23, the ports of the two-way cock 22 being then so located as to establish free communication between the chamber 23 and the atmosphere through the discharge-outlet 26, thus relieving the piston from pressure in chamber 23 and causing the actuating tendency of the steam-pressure in chamber 30, operating on the piston 18, to close or seat the valve-disk 5 on its seat 6. To enable the opening and closing of the valve by means of the two-way cock 22, as just explained, the threaded sleeve 10 is first screwed out, by means of the hand wheel 25, to a point that will make the distance between the shoulder 9 and the adjacent end of the sleeve 10 equal to the amount of opening desired between the valve-disk 5 and its seat 6, the thumb-nut 13 being first unscrewed and entirely removed from the threaded end 12 (but is left attached to the hand-wheel 25 by means of a chain to prevent its becoming lost or misplaced) to enable the stem 8 to pass into the sleeve 10 without fouling, upon the sleeve 10 being unscrewed, as just explained. When the valve is operated as a hand stop-valve, the nut 13 is screwed down on the threaded end 12 until it seats tight on the end of the sleeve 10, so that both ends of sleeve 10 seats or bears solid, thus connecting the hand-wheel 25 in rigid direct connection with the valve-disk 5 for the opening and closing of same by hand, as in the case of the ordinary hand stop-valve, by means of the hand-wheel 25.

The pipes 20 and 21 are so constructed in reference to the main body or casing 2 and in such location so that the chamber 23 will fill solid with water of condensation, the velocity of the flow of which from the chamber 23, regulated by the size of the pipes 20 and 21 or by the amount of the area of the port-opening in the two-way cock 22, determines the rapidity of the movement of the piston 18 in its seating of the valve-disk 5 on its seat 6 and prevents such closing being done with a shock or slam, and thus my said invention provides a safe, reliable, and easily-operated throttle-valve, as also a similar-featured boiler-delivery stop-valve.

It is obvious that the two-way cock 22 can be placed at any convenient point for its operation, whether in or outside of the boiler room or compartment in which the valve may be located for service.

As an automatic emergency non-return stop-valve the thumb-nut 13 is removed entirely from the threaded end 12, and the threaded sleeve 10 is screwed out to the "open" position of the valve-disk 5, (which should not exceed one-fourth of the diameter of the valve-seat 6,) and the two-way cock 22 has its lever 24 placed to the position $a$ previously explained, thus establishing free communication between the chambers 23 and 30, the steam-pressure in the chambers 23 and 30 causing the valve-disk 5 to stand open until the moment the flow of steam from the valve-inlet source from any cause ceases—as for instance, because of a rupture in the boiler—when the actuating tendency of the resulting backflow of steam from the other boilers will cause the valve-disk 5 to move to its seat, but without shock or slam, by reason of the restraining action of the water contained in the chamber 23 in its flow out through the pipes 20 and 21, and thus preventing rapid movement of the piston 18, and therefore the valve-disk 5 is gradually but promptly seated, or in case a rupture should occur in the steam-mains with which pipe 29 is connected or by the opening of a hand-operated valve to atmosphere at a distant point in a system of which pipe 29 is a part, the resulting fall in pressure in chamber 23 will cause or permit the piston 18, actuated by the pressure in chamber 30, to close or seat the valve-disk 5 tightly on its seat, regardless of the intensity of the pressure in the boiler or in the steam-mains, such closing being also free from shock or slam, as above explained.

Suitable drain-outlets may be provided for clearing the pipes and chambers of the valve of water, oil, &c., when desired.

The chamber 23 and piston 18 will also operate as a preventive against the valve-disk 5 chattering or hammering on its seat when but little quantity of steam is passing through the valve, as is usually the fault in other valves of the kind mentioned under such conditions of steam-flow.

It is obvious that the essential features of my said invention could be incorporated in a valve of the character described without fully following the design herein shown and described—as, for instance, in lieu of the check-valve 27 there could be substituted a reduced or constricted area of outlet-passage from the chamber 30 to pipe 21—that is to say, a reduced area as compared to the area of the passages or conduits 20, 26, and 29—(such reduction I would prefer to be in the ratio of one to fifteen) to effect the same functions as is designed to be performed by the check-valve 27. Such a construction is shown in Fig. 4, in which the opening 34 is the reduced or constricted area of outlet-passage mentioned.

Having thus described my said invention, what I claim as new, and desire to secure by Letters Patent, is—

1. In a valve of the character described, the combination consisting of a main body or casing 2, provided with inlet-opening 3, and outlet-opening 4; and a valve-disk 5, rigidly connected to a hand opening and closing stem 7, said stem being provided with a shoulder 9, and a reduced section 8 having a threaded end 12 and a nut 13 fitted thereon; a stuffing-box 14 and gland 15 for maintaining a steam-tight joint around said stem between the conduit steam-space 30 and the atmosphere; a hand-wheel 25 rigidly connected to a threaded sleeve 10 loosely incasing said reduced section 8 and with end bearings fitted for contact with the shoulder 9 and with nut 13, and engaging into the threaded yoke 11; said valve-disk being also provided, in the steam-conduit space 30, with a steam-tight actuating-piston 18 rigidly connected thereto by means of the rod 19 and operated by the cock 22 through the conduits 20 and 21 and discharge-outlet 26; all substantially as and for the purposes shown and described.

2. In a valve of the character described, the combination consisting of a main body or casing 2, provided with inlet-opening 3, and outlet-opening 4; and a valve-disk 5, rigidly connected to a hand opening and closing stem 7, said stem being provided with a shoulder 9, and a reduced section 8 having a threaded end 12 and a nut 13 fitted thereon; a stuffing-box 14 and gland 15 for maintaining a steam-tight joint around said stem between the conduit steam-space 30 and the atmosphere; a hand-wheel 25 rigidly connected to a threaded sleeve 10 loosely incasing said reduced section 8 and with end bearings fitted for contact with the shoulder 9 and with nut 13, and engaging into the threaded yoke 11; said valve-disk being also provided in the steam-conduit space 30 with a steam-tight actuating-piston 18 rigidly connected thereto by means of the rod 19 and operated by the cock 22 through the conduits 20 and 21 and discharge-outlet 26; and the automatic valve-closing conduit 29 provided with check-valve 28, and check-valve 27 located in conduit 21; all substantially as and for the purposes shown and described.

3. In a valve of the character described, the combination consisting of a main body or casing 2, provided with inlet-opening 3 and outlet-opening 4; and a valve-disk 5, provided in the steam-conduit space 30, with a steam-tight actuating-piston 18 rigidly connected thereto by means of the rod 19 and operated by the cock 22 through the conduits 20 and 21 and discharge-outlet 26; all substantially as and for the purposes shown and described.

4. In a valve of the character described, the combination consisting of a main body or casing 2, provided with inlet-opening 3 and outlet-opening 4; and a valve-disk 5, provided in the steam-conduit space 30 with a steam-tight actuating-piston 18 rigidly connected thereto by means of the rod 19 and operated by the cock 22 through the conduits 20 and 21 and discharge-outlet 26; and the automatic valve-closing conduit 29 provided with check-valve 28, and check-valve 27 located in conduit 21; all substantially as and for the purposes shown and described.

5. In a valve of the character described, the combination consisting of a main body or casing 2, provided with inlet-opening 3 and outlet-opening 4; and a valve-disk 5, provided in the steam-conduit space 30, with a steam-tight actuating-piston 18 rigidly connected thereto by means of the rod 19 and operated by the cock 22 through the discharge-outlet 26 and conduits 20 and 21, the latter of which is provided with a reduced area of passage 34; all substantially as and for the purposes shown and described.

6. In a valve of the character described, the combination consisting of a main body or casing 2, provided with inlet-opening 3 and outlet-opening 4; and a valve-disk 5, provided in the steam-conduit space 30 with a steam-tight actuating-piston 18 rigidly connected thereto by means of the rod 19 and operated by the cock 22 through the discharge-outlet 26 and conduits 20 and 21, the latter of which is provided with the reduced-area passage 34; and the conduit 29 provided with check-valve 28; all substantially as and for the purposes shown and described.

7. In a valve of the character described, the combination consisting of a main body or casing 2, provided with inlet-opening 3, and outlet-opening 4; and a valve-disk 5 rigidly connected to a hand opening and closing stem 7, said stem being provided with a shoulder 9, and a reduced section 8 having a threaded end 12 and a nut 13 fitted thereon; a stuffing-box 14 and gland 15 for maintaining a steam-tight joint around said stem between the conduit steam-space 30 and the atmosphere; a hand-wheel 25 rigidly connected to a threaded sleeve 10 loosely incasing said reduced section 8 and with end bearings fitted for contact with the shoulder 9 and with nut 13, and engaging into the threaded yoke 11; said valve-disk being also provided in the steam-conduit space 30 with a steam-tight actuating-piston 18 rigidly connected thereto by means of the rod 19 and operated by means of the cock 22 through its discharge-outlet 26 and conduits 20 and 21, the latter of which is provided with the reduced-area passage 34; and the conduit 29 provided with check-valve 28; all substantially as and for the purposes shown and described.

In testimony whereof I have signed my name to this specification in the presence of two subscribing witnesses.

ALBERT B. WILLITS.

Witnesses:
 T. W. KINKAID,
 J. J. HORAN.